Figure 1:
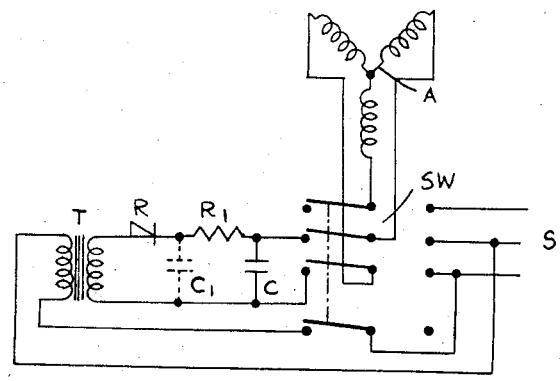

Jan. 19, 1960

SHAFI-UDDIN A. CHOUDHURY
DYNAMIC BRAKING OF INDUCTION MOTORS 2,922,097

Filed May 2, 1958

INVENTOR
SHAFI-UDDIN AHMED CHOUDHURY

ATTORNEY

United States Patent Office 2,922,097
Patented Jan. 19, 1960

2,922,097

DYNAMIC BRAKING OF INDUCTION MOTORS

Shafi-Uddin Ahmed Choudhury, Rugby, England, assignor to The British Thomson-Houston Company Limited, London, England, a British company Application May 2, 1958, Serial No. 732,725

2 Claims. (Cl. 318—212)

This invention relates to the application of dynamic braking to an induction motor, and provides an arrangement for dynamic braking which is particularly applicable when it is required to bring the motor to rest in a short period of time.

Heretofore dynamic braking has usually been effected by disconnecting the stator windings of the motor from the A.C. supply, and connecting them either to a D.C. supply, or to a capacitive reactance the value of which is designed to suit the characteristic required. Whereas D.C. excitation of the windings produces a braking torque which is small at high speed but large at low speed completing the circuit through a capacitor produces a braking torque which is large at high speeds due to self excitation, but which vanishes at the speed at which self excitation ceases.

The object of the present invention is to take advantage of the desirable parts of the characteristics of both these methods.

The invention consists on applying both capacitance and D.C. braking to an induction motor.

Thus, according to the invention, in order to effect braking a capacitor is connected to at least two of the terminals of the primary winding of the motor through which the A.C. supply, prior to its disconnection from the primary winding, was provided, and a unidirectional current is also supplied to the same or two other of said terminals.

Preferably the unidirectional current is obtained from the source of A.C. supply from which the induction motor is normally energised and it can be arranged that the said capacitor is so connected that it incidentally provides smoothing of the rectified current. The smoothing may also be increased if desired by one or more additional capacitors introduced for the purpose and connected either to the same terminals of the primary winding as those to which the first capacitor is connected, in which case it must be decoupled from the capacitor used to provide the braking torque by means of a resistance, or to different terminals.

For maximum braking effect the A.C. field provided by the connection of the capacitance should be at right angles to the field provided by the D.C. excitation.

When dynamic braking is to be applied to a 2-phase induction motor a capacitor is connected across one phase and the D.C. excitation is applied to the other phase, so that the A.C. excitation arising from the connection of the capacitor and the D.C. excitation are at right angles to one another.

In order that the invention may be readily understood, it will now be described with reference to Figures 1 to 4 of the accompanying drawings, which show typical arrangements by which it may be carried into effect.

Referring firstly to Fig. 1, there is shown at A the three-phase primary winding of an induction motor adapted to be supplied from a three-phase source S through a change-over switch Sw. When the switch is closed in one direction it connects the supply S to the primary winding of the motor for normal operation, and when the switch is closed at its other position, the motor is adapted for dynamic braking.

For dynamic braking a combination is employed of a capacitor C and a source of uni-directional current provided by a transformer T and a rectifier R. The primary winding of the transformer T is connected to two of the three-phase conductors of the supply S; thus, when the switch is closed into the position for dynamic braking, the capacitor C is connected to two of the terminals of the primary winding through which the A.C. supply, prior to its disconnection from the primary winding, was provided, and in the arrangement shown in Fig. 1, a rectified current is also supplied to the same two terminals.

The capacitor C serves to smooth the half-rectified current supplied to those terminals. If desired, additional smoothing may be obtained by adding the capacitor $C_1$, shown in interrupted lines, and decoupled from C by the resistor $R_1$.

During the early part of the braking period the major influence will be exercised by the capacitor C, although the D.C. excitation provided by the transformer T and rectifier R will also be present. As the braking effect due to the capacitor becomes less effective, and falls eventually to near zero, the D.C. excitation becomes comparatively increasingly effective to bring the machine to rest. Thus, at the beginning of the period the braking torque is much larger than would be obtained with the same D.C. excitation alone, whereas towards the end of the cycle the braking torque due to the D.C. excitation is much greater than that provided by the capacitor, so that the total effective braking is much greater than heretofore.

Figure 2:
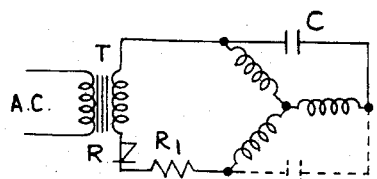

In the modified arrangement shown in Fig. 2 there is shown the primary winding A as connected only for dynamic braking, the switch Sw and supply S being omitted. In this arrangement, the capacitor C, instead of being connected to the same two terminals of the primary winding as those to which the uni-directional current is supplied, is connected to another two of the terminals of the primary winding. The capacitor C may be supplemented by the capacitor $C_1$ shown in interrupted lines and connected between the remaining terminals of the primary winding. In this arrangement, the A.C. provided by the connection of the capacitances C and $C_1$ is at right angles to the field provided by the D.C. excitation. It has been found that with this arrangement the maximum braking effect is obtained.

Figure 3:
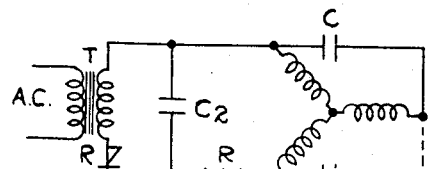

In the arrangement shown in Fig. 3, a further modification is provided which is generally the same as that shown in Fig. 2. In Fig. 3 the provision of a smoothing capacitor $C_2$ is shown, the capacitor $C_2$ being connected directly across the terminals of the secondary winding of transformer T and rectifier R, and decoupled from the winding by resistor $R_1$, so that it has little or no effect on the capacitive braking.

It is sometimes desirable to have a resistance in series with the rectifier R and the secondary winding of the transformer T so as not to render the capacitor totally ineffective during the half-cycle of the A.C. supply when the rectifier is conducting.

Figure 4:
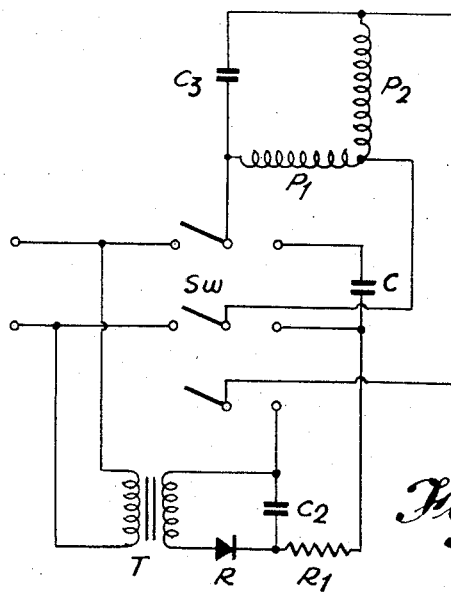

The invention is applicable to single-phase machines in the form of split-phase or capacitor induction motors. This application to two-phase motors is shown in Fig. 4. When the invention is applied to a two-phase capacitor induction motor from a single-phase source, the source of supply S being directly connected to one phase $P_1$, or main winding, of the primary winding of the motor, the other phase $P_2$, or auxiliary winding, being connected to the supply terminals through a phase-splitting capacitor $C_3$, when dynamic braking is to be effected, the supply is, by way of switch Sw, disconnected from the motor and the capacitor C is connected across one phase winding $P_1$ and the D.C. supply obtained by way of transformer T and rectifier R is connected across the other winding $P_2$. The series resistor $R_1$ is included in the connection to the winding $P_1$, as before, and the secondary winding and the resistor are preferably shunted by a smoothing capacitor. In this arrangement, the D.C. excitation is at right angles to the A.C. excitation provided by capacitance C so that maximum braking effect is obtained, as mentioned above.

Although the invention has been described in particular in connection with machines having their polyphase windings connected in star, it is equally applicable to delta connections of such machines.

What I claim is:

1. An arrangement for applying dynamic braking to an induction motor having primary and secondary windings comprising a source of alternating current supply, switching means for connecting said primary winding to said source and for disconnecting said primary winding therefrom, capacitor means, a rectifier, a transformer having primary and secondary windings, said secondary winding of said transformer being connected to said capacitor means through said rectifier, said switching means being constructed and connected to said motor primary winding and said capacitor means and to said transformer primary winding and said source in such manner whereby on disconnection of said source from said motor primary winding said capacitor means is connected to said motor primary winding and said transformer primary winding is connected to said source for continuously energizing said motor primary winding by direct current from said source through said rectifier and said capacitor means.

2. An arrangement for applying dynamic braking to an induction motor having a two-phase primary winding and a secondary winding, comprising a source of single phase supply, switching means for connecting said primary winding to said source and for disconnecting said primary winding therefrom, a first capacitor, a rectifier, a transformer having a primary winding connected to said source, and a secondary winding connected to said first capacitor through said rectifier, a further capacitor, said switching means being constructed and connected to said two motor primary winding phases and to said source and said two capacitors in such manner whereby on disconnection of said motor primary winding from said source by said switch means said first capacitor is connected to one of said primary winding phases by said switch means and said further capacitor is connected to the other of said primary winding phases.

References Cited in the file of this patent

UNITED STATES PATENTS

| 2,445,430 | Herchenroeder et al. | July 30, 1948 |
| 2,818,539 | Johnson | Dec. 31, 1957 |

FOREIGN PATENTS

| 695,340 | Germany | Aug. 22, 1940 |
| 731,765 | Germany | Feb. 15, 1943 |